(12) United States Patent
Chen et al.

(10) Patent No.: US 12,475,685 B2
(45) Date of Patent: Nov. 18, 2025

(54) METHOD AND ELECTRONIC DEVICE FOR OBJECT DETECTION, AND COMPUTER-READABLE STORAGE MEDIUM

(71) Applicant: SOLOMON TECHNOLOGY CORPORATION, Taipei (TW)

(72) Inventors: Cheng-Lung Chen, Taipei (TW); Ying Yao, Taipei (TW); Xuan Loc Nguyen, Taipei (TW); Ha Trung Pham, Taipei (TW); Tafjira Nugraha Brilian, Taipei (TW)

(73) Assignee: SOLOMON TECHNOLOGY CORPORATION, Taipei (TW)

( * ) Notice: Subject to any disclaimer, the term of this patent is extended or adjusted under 35 U.S.C. 154(b) by 360 days.

(21) Appl. No.: 18/450,254

(22) Filed: Aug. 15, 2023

(65) Prior Publication Data

US 2024/0062521 A1    Feb. 22, 2024

(30) Foreign Application Priority Data

Aug. 17, 2022   (TW) .................................. 111131021

(51) Int. Cl.
*G06V 10/00*     (2022.01)
*G06V 10/74*     (2022.01)
(Continued)

(52) U.S. Cl.
CPC .......... *G06V 10/7715* (2022.01); *G06V 10/75* (2022.01); *G06V 10/761* (2022.01); *G06V 10/764* (2022.01); *G06V 10/82* (2022.01)

(58) Field of Classification Search
CPC .... G06V 10/82; G06V 10/761; G06V 10/762; G06V 10/764; G06V 10/765;
(Continued)

(56) References Cited

U.S. PATENT DOCUMENTS 7,991,189 B2 *  8/2011  Ohira ............... G06V 30/18143
                                                382/209
8,144,994 B2 *  3/2012  Konishi ............. G06V 30/1444
                                                382/209

(Continued)

FOREIGN PATENT DOCUMENTS

CN        103632143 A    3/2014
TW        201001338 A    1/2010

OTHER PUBLICATIONS

Search Report appended to an Office Action, which was issued to Taiwanese counterpart application No. 111131021 by the TIPO on Mar. 30, 2023, with an English translation thereof.

(Continued)

*Primary Examiner* — Amir Alavi
(74) *Attorney, Agent, or Firm* — HSML P.C.

(57) ABSTRACT

A method for object detection includes: extracting a plurality of identification features from a plurality of reference images that are related to a target object; selecting a plurality of selected identification features respectively from the identification features so as to obtain a first feature dataset, and storing the first feature dataset, a quantity of selected identification features being smaller than a quantity of the identification features; in response to receipt of a to-be-detected image, performing a feature extraction operation on the to-be-detected image to obtain a second feature dataset; performing a similarity determination operation with respect to the to-be-detected image based on the first feature dataset and the second feature dataset, and calculating a quantity of instances of the target object in the to-be-detected image.

15 Claims, 6 Drawing Sheets

(51) Int. Cl.
*G06V 10/75* (2022.01)
*G06V 10/764* (2022.01)
*G06V 10/77* (2022.01)
*G06V 10/82* (2022.01)

(58) Field of Classification Search
CPC .. G06V 10/7715; G06V 10/75; G06V 10/248; G06V 10/40; G06V 10/42; G06V 10/421; G06V 10/422; G06V 10/426; G06V 10/431; G06F 18/24; G06F 18/241; G06F 18/2413; G06F 18/24133; G06F 18/24143; G06F 18/24147; G06F 18/243; G06F 18/2433
See application file for complete search history.

(56) References Cited

U.S. PATENT DOCUMENTS

| | | | | |
|---|---|---|---|---|
| 10,268,912 | B2* | 4/2019 | Adamek | G06V 10/464 |
| 10,346,721 | B2* | 7/2019 | Albright | G06N 3/04 |
| 11,416,905 | B2* | 8/2022 | Murakami | G06V 10/7553 |
| 11,455,830 | B2* | 9/2022 | Chen | G06V 10/764 |
| 11,482,041 | B2* | 10/2022 | Tagra | G06V 10/761 |
| 11,604,949 | B2* | 3/2023 | Yan | G06N 3/096 |
| 11,741,367 | B2* | 8/2023 | Namiki | G06F 18/214 |
| | | | | 382/155 |
| 11,927,965 | B2* | 3/2024 | Ebrahimi Afrouzi | |
| | | | | G06F 3/04845 |
| 12,223,722 | B2* | 2/2025 | Swisher | G06V 20/52 |
| 2020/0057916 | A1 | 2/2020 | Yamamoto et al. | |
| 2023/0036254 | A1* | 2/2023 | Arthanari | G06K 7/1413 |

OTHER PUBLICATIONS

Search Report issued to European counterpart application No. 23191515.8 by the EPO on Nov. 24, 2023, 8 pages.

* cited by examiner

METHOD AND ELECTRONIC DEVICE FOR OBJECT DETECTION, AND COMPUTER-READABLE STORAGE MEDIUM

CROSS-REFERENCE TO RELATED APPLICATION

This application claims priority to Taiwanese Invention Patent Application No. 111131021, filed on Aug. 17, 2022.

FIELD

The disclosure relates to a method and an electronic device for object detection, and related computer-readable storage medium.

BACKGROUND

Figure 1:
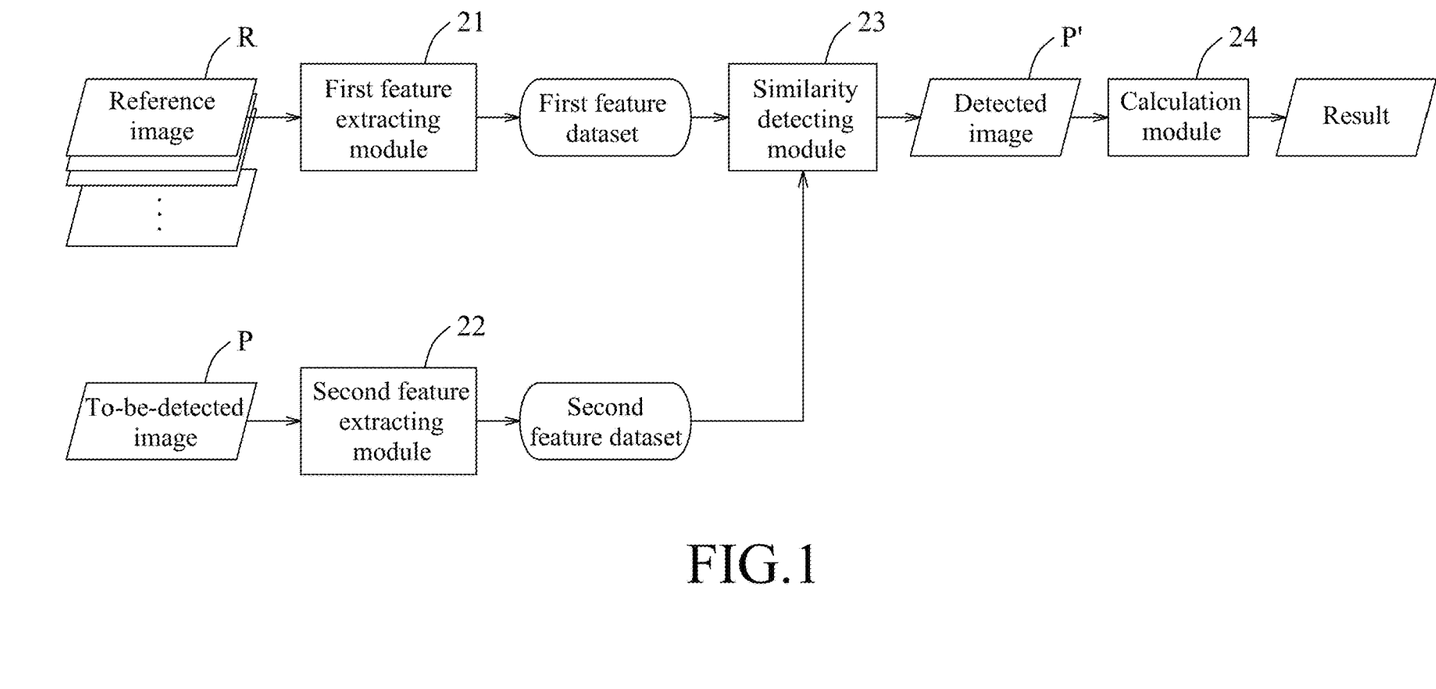
FIG. 1 is a schematic diagram illustrating a conventional process for detecting a quantity of instance(s) of a target object in an image.

FIG. 1 illustrates a conventional process for detecting a quantity of instance(s) of a target object in an image. In use, when it is desired to process a to-be-detected image (P) to detect a quantity of instance(s) of the target object included therein, a first feature extracting module 21 (which may be included in a computer device) performs a first extracting action on each of a plurality of reference images (R) (which may be pre-stored in the computer device and each of which is associated with the target object), so as to obtain a first feature dataset associated with instances of the target object in the reference images (R). Then, a second feature extracting module 22 (which may be included in the computer device) performs a second extracting action on the to-be-detected image (P) (which may be received by the computer device), so as to obtain a second feature dataset associated with one or more instances of the target object in the to-be-detected image (P). Then, a similarity detecting module 23 (which may be included in the computer device) performs a detecting action based on the first feature dataset and the second feature dataset, and generates a detected image (P') from the to-be-detected image (P) that includes a mark on every instance of the target object detected in the to-be-detected image (P). Then, a calculation module 24 (which may be included in the computer device) performs a calculation action to determine a quantity of the instance(s) of the target object in the detected image (P'), and outputs a result. Thus, the process for detecting a quantity of instances of a target object in an image is completed.

It is noted that each time the conventional process is to be implemented, the first extracting action needs to be performed on each of the reference images (R). This is time-consuming, thereby reducing the overall efficiency of the conventional process. Additionally, in some cases, the instances of the target object included in some of the reference images (R) may have very similar or even identical looks. As such, the first extracting action on those reference images (R) may not yield additional information about the target object, and the associated operations may be redundant.

SUMMARY

Therefore, an object of the disclosure is to provide a method that can alleviate at least one of the drawbacks of the prior art.

According to one embodiment of the disclosure, the method is implemented using a processor of an electronic device and includes:

a) performing a feature extraction operation on a plurality of reference images, and extracting a plurality of identification features respectively from the reference images, wherein the reference images are all related to a same target object and each include one instance of the target object;

b) performing a classification operation to select a plurality of selected identification features from among the identification features so as to obtain a first feature dataset that is related to the instances of the target object in the selected identification features, and storing the first feature dataset in a storage unit, wherein a quantity of selected identification features is smaller than a quantity of the identification features;

c) in response to receipt of a to-be-detected image, perform a feature extraction operation on the to-be-detected image to obtain a second feature dataset;

d) accessing the storage unit to obtain the first feature dataset, and performing a similarity determination operation with respect to the to-be-detected image based on the first feature dataset and the second feature dataset, so as to determine whether the to-be-detected image includes at least one instance of the target object; and e) when it is determined that the to-be-detected image includes at least one instance of the target object calculating a quantity of instances of the target object in the to-be-detected image.

Another object of the disclosure is to provide an electronic device that is configured to implement the above-mentioned method.

According to one embodiment of the disclosure, the electronic device for object detection includes:

a storage unit storing a plurality of reference images, the reference images all relating to a same target object and each including an instance of the target object;

a first feature extraction module that performs a feature extraction operation on the reference images, so as to obtain a plurality of identification features related to the target object;

a classification module that selects a plurality of selected identification features from among the plurality of identification features, so as to obtain a first feature dataset that is related to the target object, and that stores the first feature dataset in the storage unit, a quantity of the selected identification features being smaller than a quantity of the identification features;

a second feature extraction module that, in response to receipt of a to-be-detected image, performs a feature extraction operation on the to-be-detected image to obtain a second feature dataset;

a similarity determination module that accesses the storage unit to obtain the first feature dataset, that receives the second feature dataset from the second feature extraction module, and that performs a similarity determination operation with respect to the to-be-detected image based on the first feature dataset and the second feature dataset, so as to determine whether the to-be-detected image includes at least one instance of the target object; and a calculation module that, when the to-be-detected image includes at least one instance of the target object, calculates a quantity of instance(s) of the target object in the to-be-detected image.

Another object of the disclosure is to provide a computer-readable storage medium comprising instructions that would cause a processor to implement the above-mentioned method.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 2:
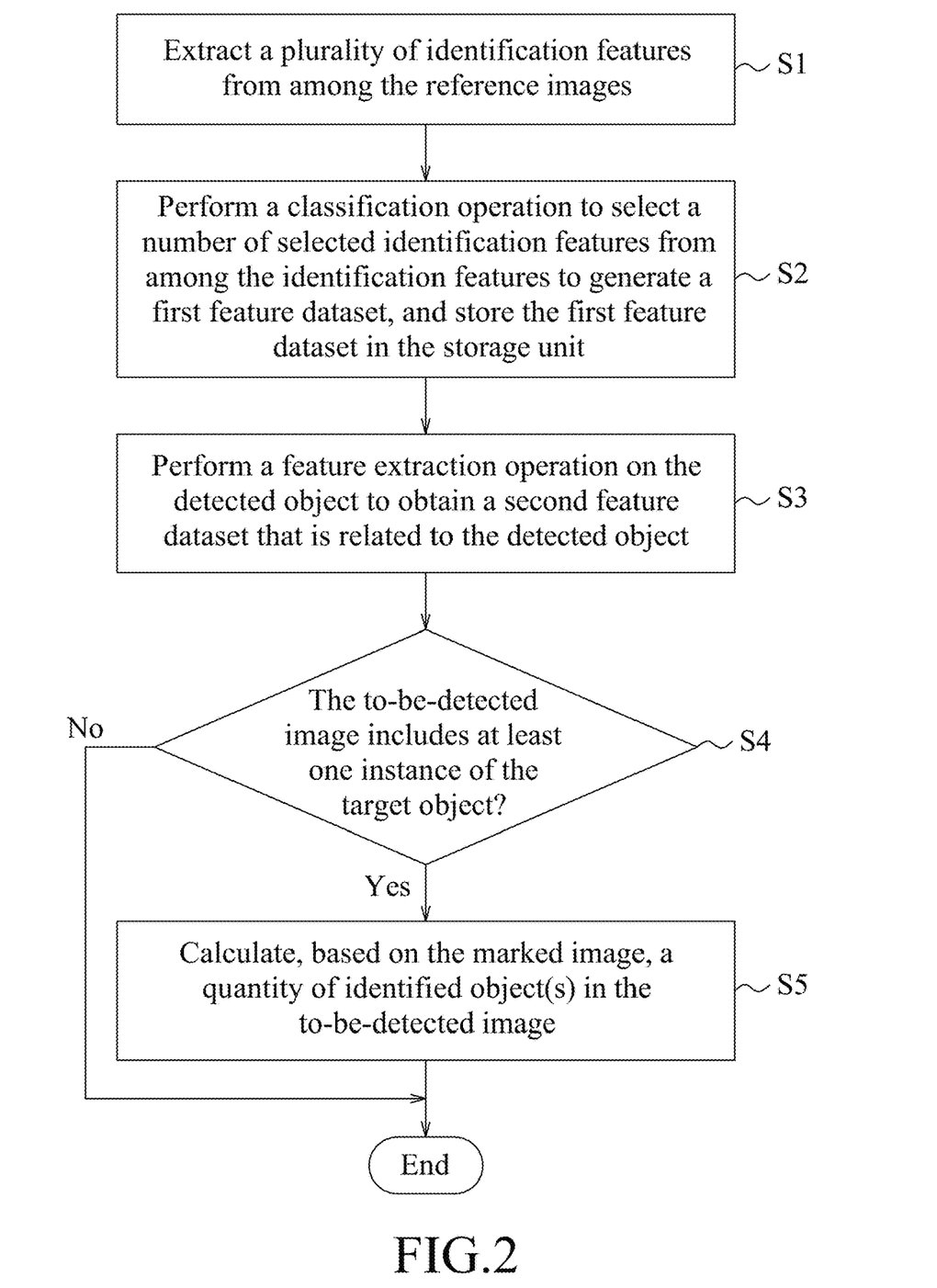
FIG. 2 is a flow chart illustrating steps of a method for object detection according to one embodiment of disclosure.

FIG. 2 is a flow chart illustrating steps of a method for object detection according to one embodiment of disclosure. In this embodiment, the method is implemented using an electronic device.

Figure 3:
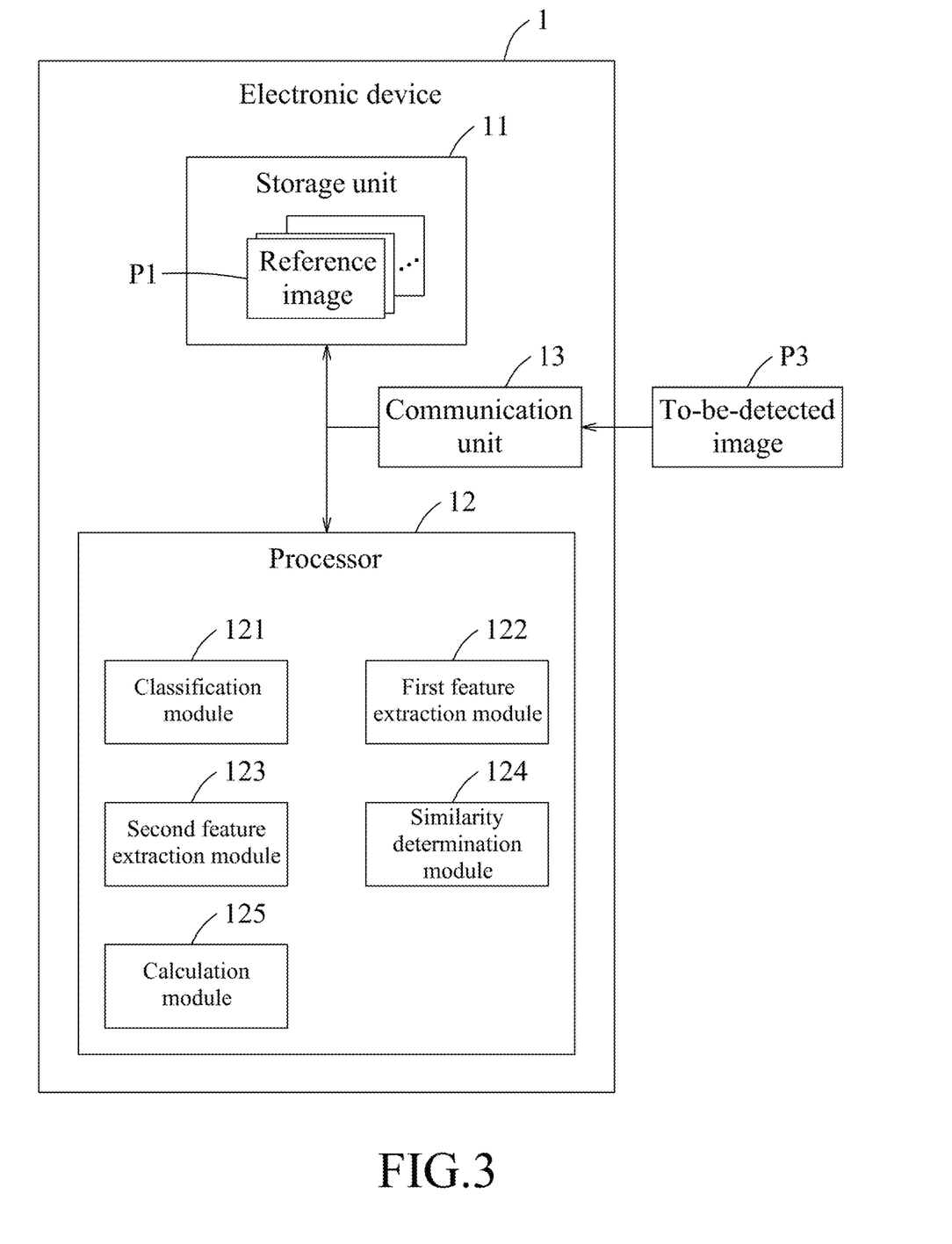
FIG. 3 is a block diagram illustrating components of an exemplary electronic device for object detection according to one embodiment of the disclosure.

FIG. 3 is a block diagram illustrating components of an exemplary electronic device 1 for object detection according to one embodiment of the disclosure. In embodiments, the electronic device 1 may be embodied using a server, a computer, a laptop, a tablet, a mobile device, etc., and includes a storage unit 11, a processor 12, and a communication unit 13.

The storage unit 11 may be embodied using, for example, random access memory (RAM), read only memory (ROM), programmable ROM (PROM), firmware, and/or flash memory, etc. The storage unit 11 stores a software application and a plurality of reference images P1 therein.

The processor 12 is connected to the storage unit 11, and may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc. The software application includes instructions that, when executed by the processor 12, cause the processor 12 to perform operations as described below. In the embodiment of FIG. 3, the processor 12 executing different portions of the software application may serve as various modules, including a classification module 121, a first feature extraction module 122, a second feature extraction module 123, a similarity determination module 124, and a calculation module 125.

It is noted that in other embodiments, the modules included in the processor 12 may be embodied using one or more application-specific integrated circuit (ASIC) chips, one or more programmable logic devices (PLDs), or one or more microcontrollers each embedded with firmware. Each of the modules included in the processor 12 may be composed of a neural network model for performing the associated operations. For example, in some embodiments, each of the first feature extraction module 122 and the second feature extraction module 123 may be embodied using a you only look once (YOLO) neural network model, using convolutional neural network (CNN) structure as a backbone. The structure of the YOLO neural network model (the layers, the neurons and the associated parameters) composing the first feature extraction module 122 may be similar or identical to that composing the second feature extraction module 123, and therefore in some embodiments, the first feature extraction module 122 and the second feature extraction module 123 may be embodied using two identical modules. It is noted that in different applications, the first feature extraction module 122 and the second feature extraction module 123 may include different neural network models with different structures.

The communication unit 13 is connected to the processor 12, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

Figure 4:
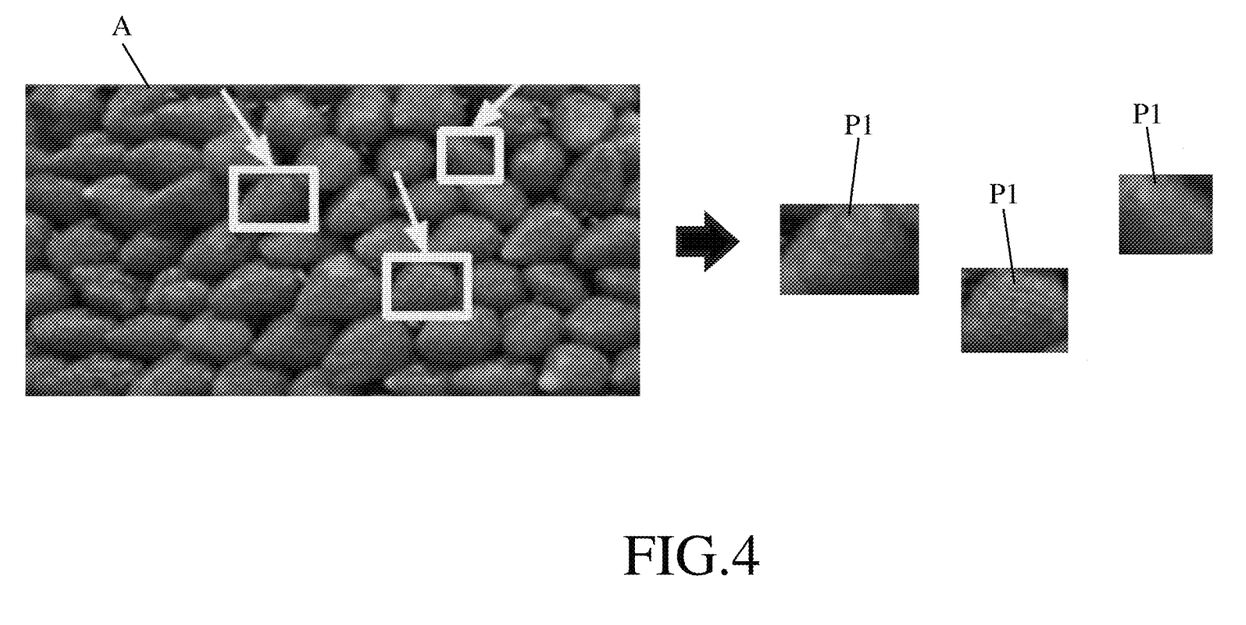
FIG. 4 illustrates a source image, which is used for obtaining a plurality of reference images.

The plurality of reference images P1 are each related to a same target object. In an example shown in FIG. 4, which illustrates a source image (A) that contains nothing but strawberries, the target object is "strawberry." But this disclosure is not limited to such example. In this embodiment, the plurality of reference images P1 may be pre-obtained by the processor 12 from the source image (A) (which may be pre-stored in the storage unit 11 or obtained via the communication unit 13). Specifically, a plurality of different areas of the source image (A), each including one recognizable instance of the target object, may be identified and cropped out to serve as the reference images P1. In some embodiments, the target objects are manually identified, while in some other embodiments, the target objects may be automatically identified using an object identification algorithm, and a result of the identification may be verified by a human.

In some embodiments, prior to the implementation of the method, a data augmentation operation may be performed by the processor 12 on one or more of the reference images P1, so as to generate at least one augmented image to serve as additional reference image(s) P1. The data augmentation operation may include one or more of a flipping (vertically or horizontally) operation, a rotating operation, a cropping operation, a resizing (enlarging or shrinking) operation, etc. It is noted that the data augmentation operation is well known in the related fields, and details thereof are omitted herein for the sake of brevity.

In use, when it is desired to perform an object detection operation on a to-be-detected image P3 to determine a quantity of object(s) included in the to-be-detected image P3 that is/are recognized as instance(s) of the target object, the method of FIG. 2 may be implemented using the electronic device 1 as shown in FIG. 3.

In step S1, the processor 12 extracts a plurality of identification features respectively from the reference images P1. In some embodiments, each of the identification features is related to a unique appearance-related characteristic (e.g., a shape, a texture, etc.) of the target object, but is not limited to such.

Specifically, the reference images P1 are inputted to the first feature extraction module 122 of the processor 12. In response, the first feature extraction module 122 performs a feature extraction operation on the reference images P1, and outputs a plurality of identification features. The identification features are then transmitted to the classification module 121 for further processing.

In step S2, in response to receipt of the identification features, the classification module 121 is configured to perform a classification operation to select a plurality of selected identification features P2 from among the identification features received from the first feature extraction module 122, so as to generate a first feature dataset using the selected identification features. It is noted that a quantity of the selected identification features P2 is smaller than a quantity of the identification features received from the first feature extraction module 122.

Specifically, in some embodiments, the first feature extraction module 122 is configured to, with respect to each of the identification features, assign the identification feature to one of a plurality of groups, based on an appearance-related characteristic of the instance of the target object to which the identification feature relates to. Each of the groups may be associated with a unique appearance-related characteristic of the target object, but is not limited to such. For each of the identification feature, the classification module 121 is configured to determine an appearance-related characteristic of the instance of the target object based on the identification features, and assign the identification feature to one of the groups based on the appearance-related characteristic thus determined. Accordingly, the instances of the target object indicated by the identification features that are assigned to the same group have the same or similar appearances-related characteristics. It is noted that the classification operation with respect to objects is readily known in the related art, and details thereof are omitted herein for the sake of brevity.

Then, the classification module 121 is configured to select one identification feature from each of the groups to serve as a selected identification feature P2. As such, a plurality of selected identification features P2 are selected respectively from the groups. In this manner, the subsequent operations may be done with respect to the selected identification features P2 instead of all of the identification features extracted from reference images P1, and therefore an amount of calculations needed for the method may be reduced without sacrificing the diversity of the information included in the reference images P1. As a result, the selected identification features P2 are related to different appearance-related characteristics of the target object, respectively. That is to say, among the reference images P1, the identification features that indicate appearance-related characteristics identical to that of the target object indicated by one of the selected identification features P2 may be discarded, and therefore the quantity of the selected identification features P2 is smaller than the quantity of identification features extracted by the first feature extraction module 122. It is noted that in other embodiments, various manners of selecting the selected identification features P2 may be employed, and this disclosure is not limited in this aspect. The selected identification features P2 obtained by the classification module 121 constitute the first feature dataset, which is then stored in the storage unit 11.

Figure 5:
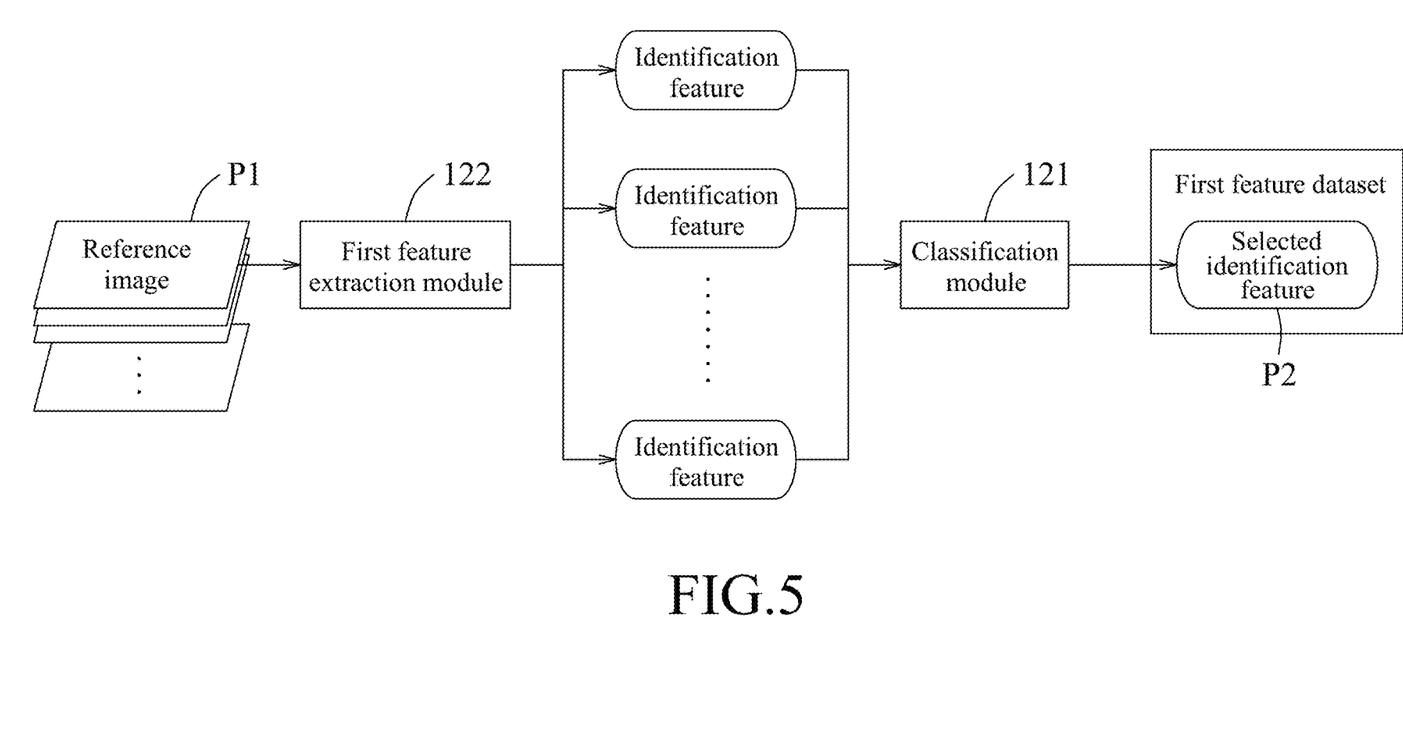
FIG. 5 illustrates an exemplary process flow of the operations included in a step of obtaining a first feature dataset related to a target object.

FIG. 5 illustrates an exemplary process flow of the operations included in steps S1 and S2. In some embodiments, the content of the first feature dataset may include information of many instances of the target object indicated by the selected identification features P2, such as appearance-related characteristics (e.g., shape, texture, etc.). In this manner, a size of the first feature dataset may be reduced without compromising diversity of data from the reference images P1.

Figure 6:
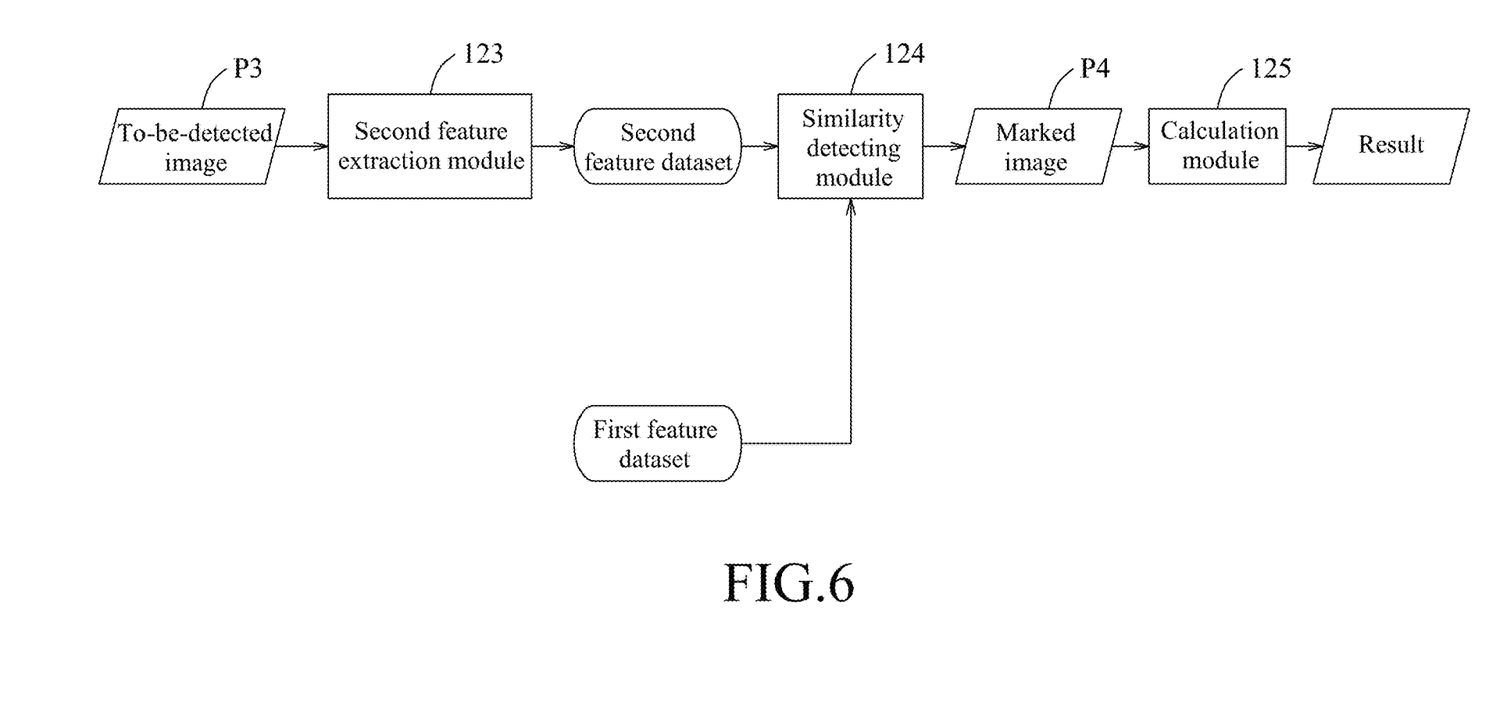
FIG. 6 illustrates an exemplary process flow of the operations included in a detection process according to one embodiment of the disclosure.

Further referring to FIG. 6, after the first feature dataset has been generated and stored, the to-be-detected image P3, which may be obtained from the storage unit 11 or from a remote device via a network (e.g., the Internet), is inputted to the second feature extraction module 123. In response to receipt of the to-be-detected image P3, the processor 12 is configured to execute a detection process which includes steps S3 to S5.

Specifically, in step S3, for each object detected in the to-be-detected image P3 (hereinafter referred to as "detected object"), the second feature extraction module 123 performs a feature extraction operation on the detected object to obtain a second feature dataset that is related to the detected object, and then the second feature extraction module 123 transmits the second feature dataset(s) thus obtained to the similarity determination module 124.

In step S4, the similarity determination module 124 accesses the storage unit 11 to obtain the first feature dataset, and performs a similarity determination operation with respect to the to-be-detected image P3 based on the first feature dataset and the second feature dataset(s), so as to determine whether the to-be-detected image P3 includes at least one instance of the target object. Specifically, the similarity determination operation may include calculating, with respect to each of the selected identification features P2 included in the first feature dataset (i.e., each representing a unique appearance-related characteristic of the target object), a similarity score between an object represented by the second feature dataset (i.e., one detected object included in the to-be-detected image P3) and the object represented by the first feature dataset. It is noted that the operation of calculating a similarity score is readily known in the related art, and details thereof are omitted herein for the sake of brevity.

When a similarity score higher than a predetermined threshold is obtained, the similarity determination module 124 may determine that the object included in the to-be-detected image P3 is an instance of the target object. In practice, one or more detected objects may be determined by the similarity determination module 124 as instances of the target object (each of these detected objects are hereinafter referred to as "identified object").

In some embodiments, prior to performing the similarity determination operation, the similarity determination module 124 may first perform a normalization operation on the second feature datasets. This is done to ensure that the second feature datasets, which are to be compared with the first feature dataset, are normalized since different to-be-detected images may have different sizes.

In some embodiments, the similarity determination module 124 is further configured to label each identified object on the to-be-detected image P3 with a mark, so as to generate a marked image P4. In some embodiments, the mark may be in the form of a dot with a relatively light color.

On the other hand, when it is determined that no similarity score is higher than the predetermined threshold, it may be deduced that the to-be-detected image P3 does not include any instance of the target object (i.e., none of the detected objects in the to-be-detected image P3 is the target object), and the similarity determination module 124 may output a signal indicating that no target object is detected. It is noted that in the case where no target object is detected, the method is terminated at this instant.

Otherwise, in the case that at least one detected object in the to-be-detected image P3 is determined as an instance of the target object, the marked image P4 is generated based on the to-be-detected image P3 and transmitted to the calculation module 125.

In step S5, the calculation module 125 calculates, based on the marked image P4, a quantity of identified object(s) in the to-be-detected image P3 (i.e., calculating a number of instances of the target object in the to-be-detected image P3), and to output a result. Specifically, the calculation module 125 may include a peak detector algorithm (e.g., the function "peak_local_max") which is applied to the marked image P4 to identify the mark(s) in the marked image P4 that is/are labeled by the similarity determination module 124. As such, the calculation module 125 is configured to record the number of the mark(s) found in the marked image P4, which in turn equals the number of identified object(s) in the to-be-detected image P3. Afterward, the number of identified object(s) in the to-be-detected image P3 may be recorded and/or outputted as the quantity of instance(s) of the target object in the to-be-detected image P3 as the result, and the method is completed.

It is noted that while in this embodiment, the calculation of the quantity of identified object(s) in the to-be-detected image P3 is done by first generating a marked image P4, and then processing the marked image P4 to calculate the quantity of identified object(s), in other embodiments, the calculation of the quantity of identified object(s) may be done using other manners (e.g., using a heatmap), and this disclosure is not limited to the specific manner of calculation as described above.

It is noted that the above method may have the following advantages over the conventional process. Firstly, since the processor 12 is configured to select a plurality of selected identification features P2 from among the identification features extracted by the processor 12 from the reference images P1, in such a way that the number of the selected identification features P2 is smaller than the number of the identification features extracted by the processor 12, and that the selected identification features P2 still possess diversified instances of the target object, the operations may be performed with respect to fewer images, thereby increasing the efficiency without sacrificing the diversity of the data that is to be processed later and that is included in the first feature dataset. Additionally, after obtaining the first feature dataset that is related to the target object, the first feature dataset is stored in the data storage 11, and may be accessed whenever it is desired to process an image for detecting the same target object. In other words, later implementations of the method with respect to the same target object may omit steps S1 and S2, and only the detection process of steps S3 to S5 needs to be implemented in such cases. As a result, the resulting calculation for the subsequent implementations of the method with respect to the same target object may be greatly reduced.

In some embodiments, after one implementation of the method has completed, when it is desired to provide additional images of the target object as reference images P1 (for supplying additional information to the first feature dataset), the operations of steps S1 and S2 or operations similar to steps S1 and S2 may be implemented in response to receipt of one or more additional image (as one or more additional reference images P1) so as to update the first feature dataset, and to store the updated first feature dataset in the storage unit 11. That is to say, the first feature extraction module 122 may perform a feature extraction operation on the another reference image to obtain another identification feature, and the classification module 121 may then, based on the another identification feature (which may or may not be selected as another identification feature), update the first feature dataset, and store the updated first feature dataset in the storage unit 11.

In some embodiments, the additional images may be images that are cropped from the to-be-detected image P3 by the calculation module 125, and each of the additional images includes one recognizable instance of the target object. For example, after the one implementation of the method, the to-be-detected image P3 may be manually inspected and cropped to obtain a plurality of cropped images, each including one recognizable instance of the target object. Alternatively, the processor 12 may be configured to crop a part of the to-be-detected image P3 that contains an object which results in a similarity score higher than the predetermined threshold to obtain a cropped image.

To sum up, embodiments of the disclosure provide a method and an electronic device for performing object detection. In the method, a plurality of reference images each including one recognizable instance of a target object are processed, and then each of the reference images is assigned to one group based on an appearance-related characteristic of the instance of the target object included in the reference image. Then, a plurality of selected images are selected from among the reference images while ensuring the diversity of the appearance-related characteristic of the instances of the target object included in the selected images, with the number of the selected images being smaller than the number of the reference images. Then, the selected images are processed to obtain a first feature dataset, which is related to the target object and which is then stored for use when a to-be-detected image is desired to be processed to determine a quantity of instance(s) of the target object in the to-be-detected image. In this manner, the operations for obtaining the first feature dataset that is related to the target object may be done by processing fewer images, thereby increasing the processing efficiency without sacrificing the diversity of the data to be processed. In some cases, since the number of images to be processed has been reduced, the structures of the neural network models used for extracting features may be modified to be able to extract more features from each of the selected images, thereby increasing the accuracy of the eventual object detection.

According to one embodiment of the disclosure, there is provided a non-transitory computer-readable storage medium for performing the above-mentioned method of object detection. The non-transitory computer-readable storage medium may store a software application including instructions that, when executed by a processor of an electronic device, cause the processor to implement the operations as described in the steps of the method of FIG. 2. In some embodiments, the non-transitory computer-readable storage medium may be in the form similar to the data storage 11 of the electronic device 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for object detection, the method being implemented using a processor of an electronic device and comprising:
   a) performing a feature extraction operation on a plurality of reference images, and extracting a plurality of identification features respectively from the reference images, wherein the reference images are all related to a same target object and each include one instance of the target object;
   b) performing a classification operation to select a plurality of selected identification features from among the identification features so as to obtain a first feature dataset that is related to the instances of the target object indicated by the selected identification features, and storing the first feature dataset in a storage unit, wherein a quantity of selected identification features is smaller than a quantity of the identification features;
   c) in response to receipt of a to-be-detected image, perform a feature extraction operation on the to-be-detected image to obtain a second feature dataset;
   d) accessing the storage unit to obtain the first feature dataset, and performing a similarity determination operation with respect to the to-be-detected image based on the first feature dataset and the second feature dataset, so as to determine whether the to-be-detected image includes at least one instance of the target object; and
   e) when it is determined that the to-be-detected image includes at least one instance of the target object calculating a quantity of instances of the target object in the to-be-detected image.

2. The method as claimed in claim 1, further comprising:
   in response to receipt of an additional image as another reference image, repeating steps a) and b) so as to update the first feature dataset.

3. The method as claimed in claim 2, wherein the additional image is cropped from the to-be-detected image, and includes one instance of the target object.

4. The method as claimed in claim 1, further comprising, prior to step a):
   performing a data augmentation operation on one or more of the reference images, so as to generate at least one augmented image to serve as another reference image, wherein the data augmentation operation includes one or more of a vertical flipping operation, a horizontal flipping operation, a rotating operation, a cropping operation, and a resizing operation.

5. The method as claimed in claim 1, wherein:
   in step a), each of the identification features is related to an appearance-related characteristic of the target object; and
   step b) is implemented in a manner that each of the selected identification features is related to a unique appearance-related characteristic of the target object.

6. The method as claimed in claim 5, wherein step b) includes:
   with respect to each of the identification features, assigning the identification feature to one of a plurality of groups, based on an appearance-related characteristic of the instance of the target object indicated by the identification feature; and
   selecting one identification feature from each of the groups to serve as one of the plurality of selected identification features.

7. The method as claimed in claim 1, wherein step e) includes generating a marked image based on the to-be-detected image, wherein the marked image has each of the at least one instance of the target object marked, and calculating, based on the marked image, a quantity of instance(s) of the target object in the to-be-detected image.

8. An electronic device for object detection, comprising:
   a storage unit storing a plurality of reference images, the reference images all relating to a same target object and each including an instance of the target object;
   a first feature extraction module that performs a feature extraction operation on the reference images, so as to obtain a plurality of identification features related to the target object;
   a classification module that selects a plurality of selected identification features from among the plurality of identification features, the number of the selected identification features being smaller than the number of the identification features, so as to obtain a first feature dataset that is related to the target object and that is stored in the storage unit, a quantity of the selected identification features being smaller than a quantity of the identification features;
   a second feature extraction module that, in response to receipt of a to-be-detected image, performs a feature extraction operation on the to-be-detected image to obtain a second feature dataset;
   a similarity determination module that accesses the storage unit to obtain the first feature dataset, that receives the second feature dataset from the second feature extraction module, and that performs a similarity determination operation with respect to the to-be-detected image based on the first feature dataset and the second feature dataset, so as to determine whether the to-be-detected image includes at least one instance of the target object; and a calculation module that, when the to-be-detected image includes at least one instance of the target object, calculates a quantity of instance(s) of the target object in the to-be-detected image.

9. The electronic device as claimed in claim 8, wherein, in response to receipt of an additional image as another reference image, the first feature extraction module performs a feature extraction operation on the another reference image to obtain another identification feature, and the classification module, based on the another identification feature, updates the first feature dataset, and stores the updated first feature dataset in the storage unit.

10. The electronic device as claimed in claim 9, wherein the additional image is cropped from the to-be-detected image by the calculation module, and includes one instance of the target object.

11. The electronic device as claimed in claim 8, further comprising a processor that performs a data augmentation operation on one or more of the reference images, so as to generate at least one augmented image to serve as another reference image, wherein the data augmentation operation includes one or more of a vertical flipping operation, a horizontal flipping operation, a rotating operation, a cropping operation, and a resizing operation.

12. The electronic device as claimed in claim 8, wherein the first feature extraction module extracts each of the identification features that is related to an appearance-related characteristic of the target object, and the classification module selects each of the selected identification features that is related to a unique appearance-related characteristic of the target object.

13. The electronic device as claimed in claim 12, wherein, the classification module:

with respect to each of the identification features, assigns the identification features to one of a plurality of groups, based on an appearance-related characteristic of the instance of the target object indicated by the identification feature; and selects one identification features from each of the groups to serve as one of the plurality of selected identification features.

14. The electronic device as claimed in claim 8, wherein:

when the to-be-detected image includes at least one instance of the target object, the similarity determination module generates a marked image based on the to-be-detected image, wherein the marked image has each of the at least one instance of the target object marked; and the calculation module calculates, based on the marked image, the quantity of instance(s) of the target object in the to-be-detected image.

15. A non-transitory computer-readable storage medium comprising instructions that, when executed by a processor of an electronic device, cause the processor to implement steps of the method of claim 1.

* * * * *